US011130850B2

(12) United States Patent
Castaneda Zuniga et al.

(10) Patent No.: US 11,130,850 B2
(45) Date of Patent: Sep. 28, 2021

(54) PROCESS FOR RECYCLING POLYOLEFIN

(71) Applicant: SABIC GLOBAL TECHNOLOGIES B.V., Bergen op Zoom (NL)

(72) Inventors: Diego Mauricio Castaneda Zuniga, Geleen (NL); Jerome Vachon, Geleen (NL); Jan Nicolaas Eddy Duchateau, Geleen (NL); Peter Neuteboom, Geleen (NL); Zeljko Knez, Maribor (SI)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 214 days.

(21) Appl. No.: 16/474,849

(22) PCT Filed: Dec. 12, 2017

(86) PCT No.: PCT/EP2017/082415
§ 371 (c)(1),
(2) Date: Jun. 28, 2019

(87) PCT Pub. No.: WO2018/121980
PCT Pub. Date: Jul. 5, 2018

(65) Prior Publication Data
US 2021/0130568 A1 May 6, 2021

(30) Foreign Application Priority Data

Jan. 2, 2017 (EP) .................................. 17150047

(51) Int. Cl.
*B29B 17/02* (2006.01)
*C08J 11/08* (2006.01)
*B29B 17/00* (2006.01)

(52) U.S. Cl.
CPC .............. *C08J 11/08* (2013.01); *B29B 17/02* (2013.01); *B29B 2017/0015* (2013.01); *B29B 2017/0293* (2013.01); *C08J 2323/06* (2013.01); *C08J 2323/08* (2013.01)

(58) Field of Classification Search
USPC .......................................................... 521/47
See application file for complete search history.

(56) References Cited

U.S. PATENT DOCUMENTS

| | | | |
|---|---|---|---|
| 5,696,195 A | 12/1997 | Tuminello et al. | |
| 5,951,940 A | 9/1999 | Nosker et al. | |
| 6,034,170 A | 3/2000 | Tuminello et al. | |
| 6,056,791 A | 5/2000 | Weidner et al. | |
| 6,527,206 B1 | 3/2003 | Wuebbels et al. | |
| 2007/0270064 A1 | 11/2007 | Aseere | |
| 2009/0156737 A1 | 6/2009 | Schindler et al. | |
| 2012/0112374 A1 | 5/2012 | Ohtani et al. | |
| 2012/0258150 A1 | 10/2012 | Rauckhorst et al. | |
| 2013/0234350 A1 | 9/2013 | Osswald | |

FOREIGN PATENT DOCUMENTS

| | | |
|---|---|---|
| CA | 2001202 A1 | 4/1990 |
| EP | 0838318 A2 | 4/1998 |
| EP | 1834978 A1 | 9/2007 |
| GB | 2242434 A | 10/1991 |
| GB | 2322326 A | 8/1998 |
| WO | 9600610 A1 | 1/1996 |
| WO | 2004110603 A2 | 12/2004 |
| WO | 2007057326 A1 | 5/2007 |
| WO | 2009039518 A2 | 3/2009 |
| WO | 2013146558 A1 | 10/2013 |
| WO | 2014081458 A1 | 5/2014 |
| WO | 2015180922 A1 | 12/2015 |
| WO | 2018001486 A1 | 1/2018 |

OTHER PUBLICATIONS

Abedin, "Micronization of Polyethylene Wax in an Extrusion Process using Supercritical Carbon Dioxide," Thesis Presented to the University of Waterloo, Canada (2011); 145 Pages.
Abedin, "Micronization of Polymer in an Extrusion Process using Supercritical Carbon Dioxide," Institute for Polymer Research (2011)—University of Waterloo Canada; 35 Pages.
Andrew J. Peacock, "Handbook of Polyethylene: Structures, Properties and Applications," Marcel Dekker, Inc., New York, 2000, pp. 43-66.
Beyler, Craig L., and Marcelo M. Hirschler. "Thermal Decomposition of polymers." SFPE handbook of fire protection engineering 2 (2002). (Year:2002).
European Search Report; European Application No. 17150047.3 filed Jan. 2, 2017, 2 pages.
Farmer et al. "The Course of Autoxidation Reactions in Polyisoprenes and Allied Compounds. Part VII. Rearrangement of Double Bonds During Autoxidation"; J. Chemical Soc.; 1943, pp. 541-547.
Fukne-Kokot et al., "Comparison of different methods for determination of the S-L-G equilibrium curve of a solid component in the presence of a compressed gas," Fluid Phase Equilibria 173 (2000) 297-310.
Hopewell et al. "Plastics recycling: challenges and opportunities"; Philosophical Transation of the the Royal Society, vol. 364; 2009, pp. 2115-2126.
International Search Report; International Application No. PCT/EP2017/082415; International Filing Date: Dec. 12, 2017; dated Jan. 18, 2018; 3 pages.

(Continued)

*Primary Examiner* — Terressa Boykin
(74) *Attorney, Agent, or Firm* — Cantor Colburn LLP

(57) ABSTRACT

The present invention relates to a process for recycling polyolefin, comprising the steps of: 1) feeding a solid post-consumer polyolefin composition comprising polyolefin and contaminants and a flow of an extraction fluid to an extractor having a pressure of 100-1000 bar and a temperature of 20-80° C. to obtain a solid extracted composition, 2) melting the solid extracted composition to obtain a melted composition, 3) providing particles from the melted composition by: 3a) mixing a flow of a supercritical fluid in the melted composition in a pressure vessel to obtain a solution saturated with the supercritical fluid and 3b) passing the solution from the pressure vessel through a throttling device to a spraying tower to expand the solution to obtain polyolefin particles in the spraying tower.

18 Claims, 1 Drawing Sheet

(56) References Cited

OTHER PUBLICATIONS

Jung et al., "Particle design using supercritical fluids: Literature and patent survey," Journal of Supercritical Fluids 20 (2001) 179-219.
Knez et al., "Particles formation and particle design using supercritical fluids," Current Opinion in Solid State and Materials Science, Elsevier Science LTD, Oxford, GB, vol. 7, Jan. 1, 2003, pp. 353-361.
Martin et al., "Micronization processes with supercritical fluids: Fundamentals and mechanisms" Advanced Drug Delivery Reviews 60 (2008) 339-350.
Nalawade, "Polymer Melt Micronisation using Supercritical Carbon Dioxide as Processing Solvent," (2005) 145 Pages.
P.D. Iedema et al, "A Development of MWD and Branching During Peroxide Modification of High-Density Polyethylene by SEC-MALS and Monte Carlo Simulation," Polymer; Jun. 2013, pp. 4093-4104, vol. 54.
Serbanescu; "Kinetic analysis of cellulose pyrolysis: a short review"; Chemical Papers 68; vol. 7; 2014, pp. 847-860.
Weidner, High pressure micronization for food applications,: J. of Supercritical Fluids 47 (2009) 556-565.
Written Opinion; International Application No. PCT/EP2017/082415; International Filing Date: Dec. 12, 2017; dated Jan. 18, 2018; 4 pages.

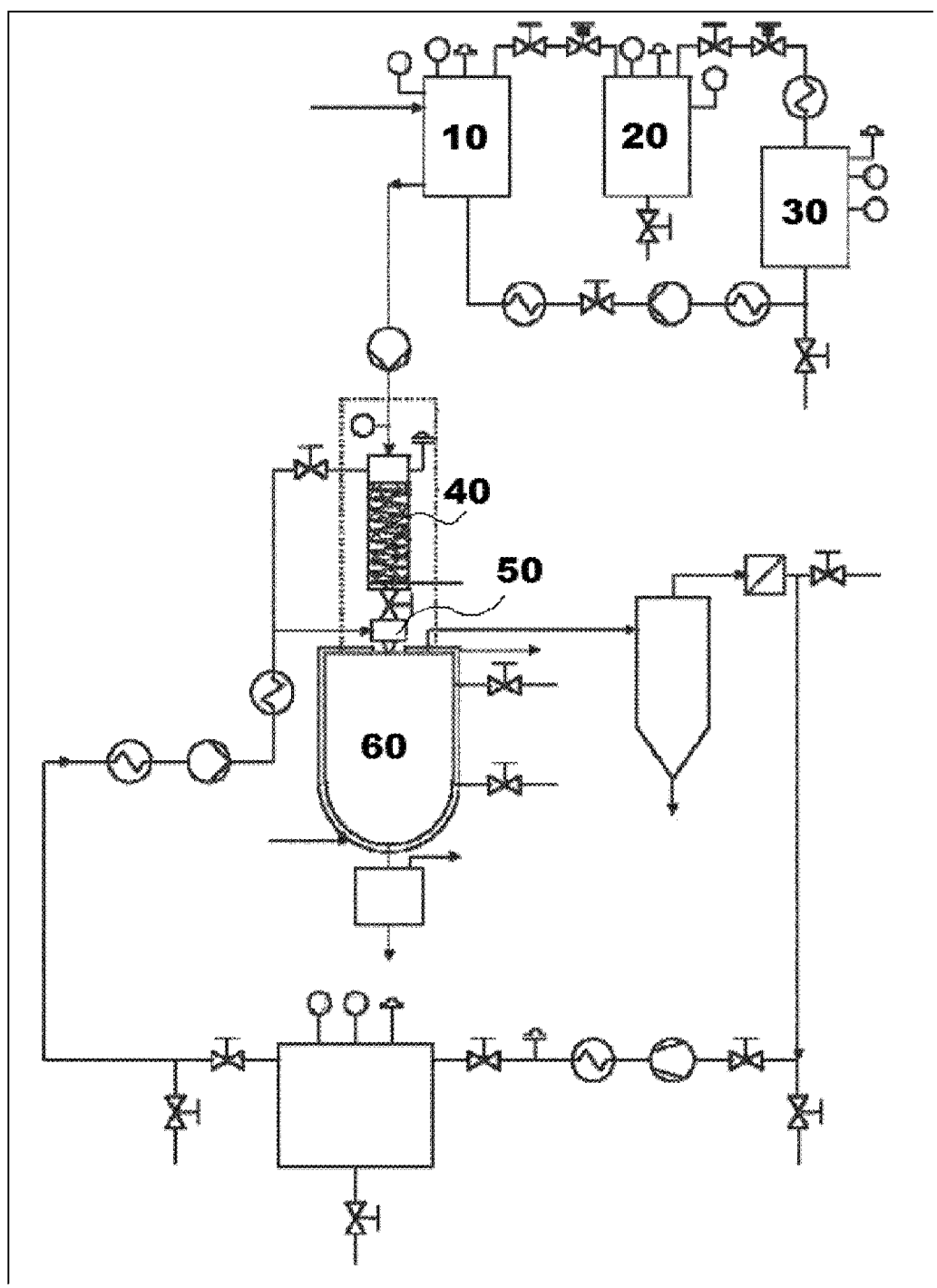

PROCESS FOR RECYCLING POLYOLEFIN

CROSS REFERENCE TO RELATED APPLICATIONS

This application is a 371 of International Application No. PCT/EP2017/082415, filed Dec. 12, 2017, which is incorporated by reference in its entirety, and which claims priority to European Application Serial No. 17150047.3, filed Jan. 2, 2017.

The invention relates to a process for recycling polyolefin.

Hopewell et. al., Plastics recycling: challenges and opportunities, Phil. Trans. R. Soc. B (2009) 364, 2115-2126 describes recycling of plastics. Rigid plastics are typically ground into flakes and cleaned to remove food residues, pulp fibers and adhesives. Cleaning is typically done by washing with water. Cleaning surfaces through friction without using water is also mentioned.

U.S. Pat. No. 6,527,206 discloses a process for processing mixed waste for consisting of plastics, paper-plastic-composite materials, glass, metals, paper, cardboard, and other waste substances.

U.S. Pat. No. 5,951,940 discloses a method of recycling post-consumer plastic waste by producing a blow moldable material comprising the steps of (a) providing mixed post-consumer plastics waste including polyolefin and non-polyolefin components, and (b) melt-compounding said mixed post-consumer plastics so as to form a continuous phase including a blend of said polyolefin components and minor phases including said non-polyolefin components, said minor phases being microdispersed in said continuous phase.

Known recycling processes of polyolefin result in lower quality polyolefin flakes which have limited applications. Further, the recycling process produces a large amount of waste material such as waste water.

It is an object of the present invention to provide a process for recycling polyolefin in which the above-described and/or other problems are solved.

Accordingly, the present invention provides a process for recycling polyolefin, comprising the steps of:

1) feeding a solid post-consumer polyolefin composition comprising polyolefin and contaminants and a flow of an extraction fluid to an extractor having a pressure of 100-1000 bar and a temperature of 20-80° C. to obtain a solid extracted composition, 2) melting the solid extracted composition to obtain a melted composition, 3) providing particles from the melted composition by:

3a) mixing a flow of a supercritical fluid in the melted composition in a pressure vessel to obtain a solution saturated with the supercritical fluid and 3b) passing the solution from the pressure vessel through a throttling device to a spraying tower to expand the solution to obtain polyolefin particles in the spraying tower.

According to the process of the invention, a solid post-consumer polyolefin composition containing polyolefin and contaminants is subjected in step 1) to an extraction at a relatively low temperature to physically remove contaminants by a flow of an extraction fluid. The conditions are selected such that the post-consumer polyolefin composition and the extracted composition are in solid state. This step removes contaminants from the post-consumer polyolefin composition to avoid these contaminants from being subjected to the more severe conditions of step 3) and producing further contaminants. The extracted composition is melted in step 2) and subsequently subjected to step 3), a so-called PGSS (Particles from Gas Saturated Solutions) process, which provides polyolefin particles. The polyolefin particles so obtained are of high purity since most of the remaining contaminants will be present in the gaseous phase upon the expansion of the saturated solution in the spraying tower. Accordingly, the polyolefin particles so obtained can be used for applications for which recycled polyolefins are not normally used, such as food and medical applications.

Step 1)

In step 1), a solid post-consumer polyolefin composition and a flow of an extraction fluid are fed to an extractor to obtain an extracted composition in a solid state. This step allows physical removal of contaminants by a flow of an extraction fluid. Due to the pressure and the temperature in the extractor, the extraction fluid is in a supercritical state or a near-supercritical state. Therefore, the contaminants are captured and are dissolved in the extraction fluid to be separated from polyolefin. Such extraction is advantageous in that the extraction fluid can enter inside of the waste composition to remove contaminants more effectively than water used for washing.

The extraction fluid comprising the removed contaminants is discharged from the extractor to a separator having a lower pressure and a lower temperature. Upon lowering the pressure and the temperature, the solubility of the contaminants in the extraction fluid is drastically reduced, releasing the captured contaminants from the extraction fluid. Accordingly, the extraction fluid can be reused without extensive purification. This is highly advantageous compared to washing by water which results in a large amount of waste water which cannot be reused without purification.

Solid Post-Consumer Polyolefin Composition

The solid post-consumer polyolefin composition comprises contaminants, unlike virgin polyolefin composition. The term "contaminants" is herein understood to mean components in the waste composition which are not polyolefin.

The contaminants may include e.g. metals, papers, pigments, ink, adhesives, food residues, and polymer additives coming from manufacturing or processing processes. These contaminants may thermally decompose if subjected to severe conditions used in a PGSS process and produce different types of contaminants which are more difficult to remove from the polyolefin particles produced. For example, papers may decompose into char, which forms black particles by the conditions of a PGSS process, see e.g. Chemical Papers, July 2014, Volume 68, Issue 7, pp 847-860. Lipids in food residues may thermally degrade into fatty acids and conjugated enones that give color by the conditions in a PGSS process, see e.g. J. Chem. Soc., 1943, 541-547 and J. AGR. FOOD CHEM., VOL. 17, NO, 1, JAN.-FEB. 1969 18-21. Removal of these substances adds an extra step, which is less efficient. Some of the contaminants may even be trapped in the polyolefin particles upon their formation by PGSS, which may be extremely difficult to remove.

Typically, the solid post-consumer polyolefin composition comprises at least 10 wt % of the contaminants. The amount of the contaminants and the conditions of step 1) are chosen such that the extracted composition has sufficiently low amounts of contaminants in order to obtain high purity particles in step 3). For example, the solid post-consumer polyolefin composition may comprise at most 50 wt % of the contaminants, for example the waste composition may comprise 20-40 wt % of the contaminants.

The solid post-consumer polyolefin composition may be fed to the extractor at a temperature lower than the temperature of the extractor, e.g. room temperature, or at a temperature which is substantially the same as the temperature of extractor, e.g. 40-80° C.

Polyolefin

The polyolefin in the solid post-consumer polyolefin composition is preferably polypropylene or polyethylene, for example linear low density polyethylene (LLDPE), low density polyethylene (LDPE), high density polyethylene (HDPE). The solid post-consumer polyolefin composition may comprise only one type of polyolefin, such as only polyethylene or only LDPE, but also may be a mixture of different types of polyolefin, e.g. a mixture of polypropylene, LDPE and LLDPE.

Extracted Composition

Preferably, the extracted composition comprises at most 1 wt % of the contaminants, preferably at most 0.1 wt %, more preferably at most 0.05 wt %.

Extraction Fluid

The extraction fluid may be selected from the group consisting of halogenated hydrocarbons, aliphatic hydrocarbons, cyclic hydrocarbons, aromatic hydrocarbons, esters, ethers. The extraction fluid may be selected from the group consisting of $CO_2$, $NH_3$, $H_2O$, $N_2O$, $CH_4$, ethane, propane, propylene, n-butane, i-butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether and $SF_6$ and combinations thereof.

The use of $CO_2$ is advantageous in that it is readily available and is inexpensive. Accordingly, in some preferred embodiments, the extraction fluid is $CO_2$. In some embodiments, the extraction fluid is a mixture of $CO_2$ and any of the above mentioned extraction fluids (e.g. a mixture of $CO_2$ and ethane) or a mixture of $CO_2$ and water, which may result in an increased efficiency of the extraction.

Preferably, the flow of the extraction fluid is fed to the extractor at a temperature which is substantially the same as the temperature of extractor, e.g. 20-80° C., for example 40-80° C., for example 50-70° C.

Extractor Conditions

The conditions in the extractor are selected such that the post-consumer polyolefin composition and the extracted composition are in solid state.

The extractor to which the solid post-consumer polyolefin composition and the flow of the extraction fluid are fed has a pressure of 100-1000 bar, for example 200-800 bar, for example 300-500 bar.

The extractor to which the solid post-consumer polyolefin composition and the flow of the extraction fluid are fed has a temperature of 20-80° C., for example 40-80° C., for example 50-70° C.

Step 1) is typically performed such that the solid post-consumer polyolefin composition has a residence time in the extractor of 0.5-2 hours. The term "residence time" refers to the period from the time point at which the solid post-consumer polyolefin composition is fed to the extractor to the time point at which the solid extracted composition leaves the extractor.

The weight ratio of the extraction fluid to the solid post-consumer polyolefin composition is preferably 1-300, for example 5-200, for example 10-150.

Step 1) may be performed in a batch operation typically involving one extractor or a semi-continuous or continuous operation typically involving more than one extractor.

Additional Steps

The process according to the invention may further comprise the step of pretreating a waste mixture before step 1) to provide the solid post-consumer polyolefin composition of step 1). By this step, the amount and the type of the contaminants are reduced such that effective extraction can be performed in step 1).

The waste mixture may comprise polyolefin and a large amount of contaminants, for example the waste mixture may comprise 20-80 wt % of contaminants.

The pretreating may e.g. be performed by any known methods such as washing, magnetic separation and/or size reduction. Suitable methods are described in Hopewell et. al., Plastics recycling: challenges and opportunities, Phil. Trans. R. Soc. B (2009) 364, 2115-2126.

Preferably, the extraction fluid is discharged from the extractor, fed to a separator having a pressure from 1 to 100 bar and a temperature of 20-80° C. and recycled to the extractor. The extraction fluid discharged from the extractor comprises contaminants removed from the solid post-consumer polyolefin composition. This gas is fed to a separator and the contaminants are released. The gas is then recycled to be fed to the extractor. This is advantageous since no waste material is produced from the extraction fluid, unlike when water is used for cleaning.

Step 2)

In step 2), the extracted composition is melted to a temperature above the melting point of the polyolefin in the extracted composition to obtain a melted composition.

Step 3)

In step 3a), a melted composition of a polyolefin is first provided in a pressure vessel. A flow of a supercritical fluid is mixed into the melted composition in the pressure vessel to obtain a solution saturated with the supercritical fluid. In step 3b), the solution saturated with the supercritical fluid is passed from the pressure vessel to a throttling device and subsequently to a spraying tower.

The temperature behavior of the supercritical fluid during the expansion is described by the Joule Thomson coefficient as explained for instance in the book (Thermodynamics: An Engineering Approach, 5th Ed Cengel, Yunus A.; Boles, Michael A. Published by McGraw-Hill College, Boston, Mass., 2006; ISBN 10: 0072884959/ISBN 13: 9780072884951). The magnitude of the cooling during the expansion of the solution in the spraying tower will depend on the type of the supercritical fluid and the operating conditions of the process.

Typically, step 3a) is performed by feeding the melted composition of the polyolefin in a pressure vessel, adding a flow of a supercritical fluid to the melted composition in the pressure vessel through a high pressure pump and mixing the supercritical fluid and the melted composition. The mixing may be performed by a mixing element, which may be for example a static mixer, a stirrer or an extruder. The mixing element is preferably a static mixer.

Preferably, in step 3a), the pressure vessel has a pressure of 100 to 1000 bar, more preferably 150 to 800 bar, more preferably 200 to 600 bar, more preferably 250 to 500 bar. The pressures in the pressure vessel and in the throttling device are preferably substantially the same, for example the pressure in the pressure vessel is at most 20 bar, at most 15 bar, at most 10 bar or at most 5 bar higher than the pressure in the throttling device. The pressure in the pressure vessel is lower than the pressure in the extractor.

Preferably, in step 3a), the solution saturated with the supercritical fluid in the pressure vessel has a temperature of 100 to 400° C., more preferably 150 to 350° C., more preferably 175 to 300° C.

Preferably, the flow of the supercritical fluid has a temperature which is substantially the same as the temperature of the melted composition of the polyolefin to which the flow of the supercritical fluid is added. Preferably, the flow of the supercritical fluid is fed to the pressure vessel at a temperature of 100 to 400° C., more preferably 150 to 350° C., more preferably 175 to 300° C.

When the melted composition of the polyolefin is saturated with the supercritical fluid, i.e. when the solution saturated with the supercritical fluid is obtained in the pressure vessel, it is passed on to the throttling device.

The throttling device may be any element which has a suitable opening which provides a diameter restriction which gives the pressure increase. The throttling device includes nozzles, capillaries, valves. The throttling device is connected with the pressure vessel via a valve which controls whether throttling device is in a fluid connection with the pressure vessel. The solution is introduced to the throttling device by opening the valve.

The throttling device is heated to such a temperature that there is no substantial change in the temperature of the solution when the solution enters and passes the throttling device. Preferably, the solution in the throttling device has a temperature of 100 to 400° C., more preferably 150 to 350° C., more preferably 175 to 300° C.

In some preferred embodiments, a further flow of a supercritical fluid is injected in the throttling device. Such a further flow of a supercritical fluid allows producing clean polyolefin particles with controlled particle size distribution even when the melted composition has a high viscosity. Further, less amount of supercritical fluid may be used by injecting the supercritical fluid in the pressure vessel and the throttling device than by injecting the supercritical fluid only in the pressure vessel.

Preferably, said further flow of the supercritical fluid has a temperature which is substantially the same as the temperature of the solution saturated with the supercritical fluid to which said further flow of the supercritical fluid is added. Preferably, said further flow of the supercritical fluid is fed to the throttling device at a temperature of 100 to 400° C., more preferably 150 to 350° C., more preferably 175 to 300° C.

The supercritical fluid to be added to the throttling device and the supercritical fluid to be added to the pressure vessel may be of different substances, but are preferably of same substances.

The spraying tower has an atmospheric pressure. Due to the pressure difference, the solution saturated with the supercritical fluid is introduced from the throttling device to the spraying tower. The temperature in the spraying tower is below the melting temperature of the melted composition. Polyolefin particles are formed in the spraying tower.

Polyolefin Particles

The particles obtained by the process according to the invention are of high purity since most of the remaining contaminants will be present in the gas phase upon the formation of the solid polyolefin particles.

Preferably, the particles obtained by the process according to the invention comprise at least 99 wt %, more preferably at least 99.5 wt %, more preferably at least 99.9 wt %, more preferably at least 99.99 wt %, of polyolefin.

The polyolefin particles have compositions depending on the type of polyolefins in the solid post-consumer polyolefin composition.

The polyolefin particles are preferably made of polypropylene or polyethylene, for example linear low density polyethylene (LLDPE), low density polyethylene (LDPE), high density polyethylene (HDPE).

The production processes of LLDPE, LDPE and HDPE are summarized in Handbook of Polyethylene by Andrew Peacock (2000; Dekker; ISBN 0824795466) at pages 43-66. Various properties such as density and degree of crystallinity of LLDPE, LDPE and HDPE are summarized in page 16, Table 1 of the same book. Various properties such as density and degree of crystallinity of polypropylene are summarized in page 23, Table 2 of the same book.

A further advantage of the process according to the invention is that polyolefin particles are obtained which can directly be used for certain applications such as masterbatch, foam, and carpet backing. Further, the polyolefin particles so obtained can be used for applications for which recycled polyolefins are not normally used, such as food and medical applications. Polyolefin particles for use in such applications typically require an average particle size of 200-1000 µm, for example 400-600 µm. In conventional processes for making or recycling polyolefin, polyolefin pellets of flakes are obtained which require mechanical grinding before being used as polyolefin particles. Such mechanical grinding step of the obtained polyolefin can be eliminated according to the process of the invention.

Preferably, the polyolefin particles obtainable by the process according to the invention have a median particle size of 200-1000 µm, for example 400-600 µm, as determined by scanning electron microscope. The median particle size may be calculated by determining the particle size of e.g. 50-100 particles.

Collecting of Particles

The polyolefin particles formed in the spraying tower are collected from the bottom of the spraying tower. The gas phase in the spraying tower may contain finer particles. The gas phase with entrained particles may be passed through a cyclone separator to recover the particles contained therein. This increases the recovery rate of the particles.

A flow of a supercritical fluid is fed to the pressure vessel in step 3a). The term 'supercritical fluid' is well-known and is meant a highly compressible substance in a supercritical state. The term 'supercritical fluid' is herein used interchangeably with 'the substance which forms supercritical fluid'. The supercritical fluid may be a supercritical fluid of substances such as halogenated hydrocarbons, aliphatic hydrocarbons, cyclic hydrocarbons, aromatic hydrocarbons, esters, ethers. The supercritical fluid may a supercritical fluid of substances selected from the group consisting of $CO_2$, $NH_3$, $H_2O$, $N_2O$, $CH_4$, ethane, propane, propylene, n-butane, i-butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether and $SF_6$ and combinations thereof. Preferably, the supercritical fluid is not a supercritical fluid of nitrogen.

The use of $CO_2$ as the supercritical fluid is advantageous in that it is readily available and is inexpensive. Accordingly, in some preferred embodiments, the supercritical fluid is a supercritical fluid of $CO_2$.

In other embodiments, substances having a relatively high solubility in a melted composition of a polyolefin are advantageously used when the melted composition has a particularly low flowability. $SF_6$ has a particularly high solubility in the melted LDPE composition which leads to an easier formation of the solution saturated with $SF_6$. The high solubility of the supercritical fluid results in a large increase in the flowability of the melted LDPE composition. This reduces the risk of the clogging of the opening through which the saturated solution is expanded. Additionally, the increase in the flowability of the melted LDPE composition leads to a more uniform particle size, which may be advantageous in certain applications such as carpet backing. Accordingly, the supercritical fluid is a supercritical fluid of $SF_6$ in some preferred embodiments.

Supercritical Fluid/Polyolefin Ratio

The weight ratio of the substance of the supercritical fluid to the melted composition is preferably 1-300, for example 2-200, 3-100, 4-50 or 5-10.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

FIG. 1 is a schematic illustration of an example of the system for performing the process according to the invention.

The system comprises an extraction system comprising an extractor 10, a separator 20 and a $CO_2$ tank 30. A solid post-consumer polyolefin composition is fed to the extractor 10 having a pressure of 100-1000 bar and a temperature of 20-80° C. A flow of $CO_2$ gas is also fed to the extractor 10 to extract contaminants in the composition. The $CO_2$ gas comprising the contaminants is subsequently fed to the separator 20 having a pressure of atmospheric to 100 bar and a temperature of 20-80° C. The $CO_2$ gas releases the contaminants and is cooled and fed to the $CO_2$ tank 30. $CO_2$ gas in the $CO_2$ tank is recycled to the extractor 10 after cooling, pressurizing and heating.

The extracted composition from the extractor is melted and fed to a pressure vessel 40, to which a flow of a supercritical fluid is also fed. In the pressure vessel 40, the melted composition and the flow are mixed to obtain a solution saturated with the supercritical fluid.

The pressure vessel 40 is connected to a throttling device (nozzle) 50 via a valve. The valve can be opened and closed to control the transfer of the solution from the pressure vessel 40 to the throttling device 50. In this embodiment, the throttling device 50 is also supplied with a flow of a supercritical fluid of $CO_2$. The solution is transferred from the throttling device through its opening with a reduced diameter to the spraying tower 60. Particles are formed in the spraying tower. The particles are collected from the bottom of the spraying tower and from a cyclone. The cyclone receives gas containing fine particles from the spraying tower and recovers the fine particles from the gas. $CO_2$ is recycled using appropriate compressors and heat exchangers.

The invention claimed is:

1. A process for recycling polyolefin, comprising the steps of:
   1) feeding a solid post-consumer polyolefin composition comprising polyolefin and contaminants and a flow of an extraction fluid to an extractor having a pressure of 100-1000 bar and a temperature of 20-80° C. to obtain a solid extracted composition,
   2) melting the solid extracted composition to obtain a melted composition,
   3) providing particles from the melted composition by:
      3a) mixing a flow of a supercritical fluid in the melted composition in a pressure vessel to obtain a solution saturated with the supercritical fluid, and
      3b) passing the solution from the pressure vessel through a throttling device to a spraying tower to expand the solution to obtain polyolefin particles in the spraying tower.

2. The process according to claim 1, wherein the extraction fluid comprises $CO_2$.

3. The process according to claim 1, wherein the solid post-consumer polyolefin composition comprises at least 10 wt % of the contaminants.

4. The process according to claim 1, wherein the extractor has a pressure of 200-800 bar, and/or a temperature of 40-80° C.

5. The process according to claim 1, wherein the extracted composition comprises at most 1 wt % of the contaminants.

6. The process according to claim 1, wherein the process further comprises the step of pretreating a waste mixture before step 1) to provide the waste composition of step 1.

7. The process according to claim 1, wherein the extraction fluid is discharged from the extractor, fed to a separator having a pressure from 1-100 bar and a temperature of 20-80° C. and recycled to the extractor.

8. The process according to claim 1, wherein the pressure vessel has a pressure of 100-1000 ba.

9. The process according to claim 1, wherein the pressure vessel has a temperature of 100-400° C.

10. The process according to claim 1, wherein the weight ratio of the substance of the supercritical fluid to the melted composition is 1-300.

11. The process according to claim 1, wherein the supercritical fluid is a supercritical fluid of substances selected from the group consisting of $CO_2$, $NH_3$, $H_2O$, $N_2O$, $CH_4$, ethane, propane, propylene, n-butane, i-butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether, $SF_6$, and combinations thereof.

12. The process according to claim 1, wherein the supercritical fluid is a supercritical fluid of $CO_2$.

13. The process according to claim 1, wherein the polyolefin particles obtained by step 3) comprise at least 99 wt % of polyolefin.

14. The process according to claim 1, wherein a further flow of a supercritical fluid is injected in the throttling device.

15. The process according to claim 1, wherein the extraction fluid comprises $CO_2$.

16. The process according to claim 1,
    wherein the solid post-consumer polyolefin composition comprises at least 10 wt % of the contaminants;

wherein the extractor has a pressure of 300-500 bar and/or a temperature of 50-70° C.;

wherein the extracted composition comprises at most 0.1 wt % of the contaminants;

wherein the process further comprises the step of pretreating a waste mixture before step 1) to provide the waste composition of step 1), wherein the waste mixture comprises 20-80 wt % of contaminants;

wherein the extraction fluid is discharged from the extractor, fed to a separator having a pressure from 1-100 bar and a temperature of 20-80° C. and recycled to the extractor;

wherein the pressure vessel has a pressure of 150-800 bar;

wherein the pressure vessel has a temperature of 150-350° C.; and wherein the weight ratio of the substance of the supercritical fluid to the melted composition is 2-200.

17. The process according to claim 16, wherein the supercritical fluid is a supercritical fluid of $CO_2$.

18. The process according to claim 16, wherein the pretreating involves washing, magnetic separation and/or size reduction.

* * * * *